Sept. 8, 1931.  A. F. MASURY  1,822,159
INDIVIDUAL WHEEL MOUNTING
Filed June 13, 1929
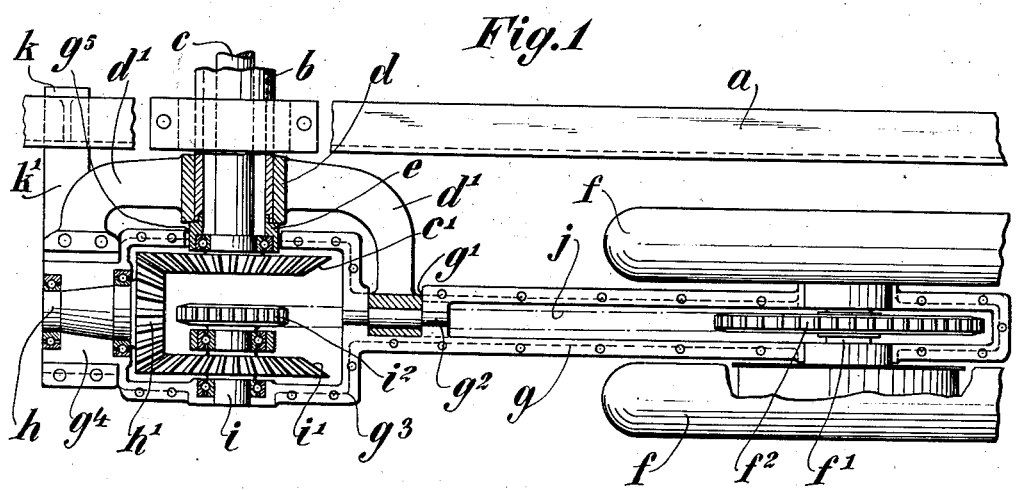
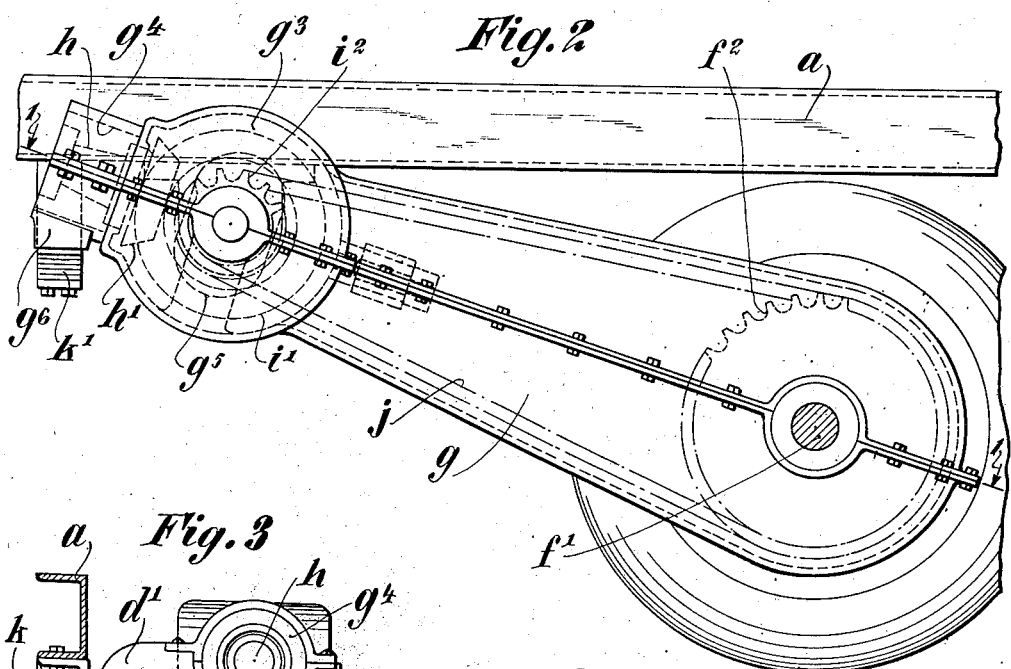
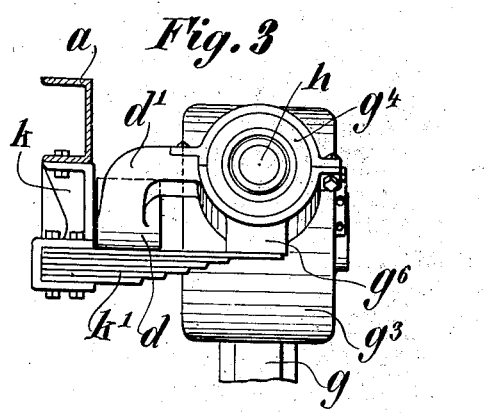
Inventor:
Alfred F. Masury,
By his Attorneys:

Patented Sept. 8, 1931

1,822,159

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

INDIVIDUAL WHEEL MOUNTING

Application filed June 13, 1929. Serial No. 370,541.

The present invention relates to wheel mountings for motor vehicles and embodies, more specifically, an improved form of wheel mounting adapted to withstand the severe stresses during operation of the vehicle and to afford a high degree of flexibility and strength.

In the recent development of motor vehicle design, it has been proposed to mount the wheels individually upon the vehicle frame at suitable points and transmit the drive to such wheels through suitably constructed transmissions. To transmit, effectively, the drive from the sprung elements to the unsprung wheel, the present invention seeks to provide a drive which is highly flexible and permits relative movement between the frame and wheel in every direction without impairing the character of the drive.

An object of the invention, therefore, is to provide an individual wheel mounting of improved form and embodying a drive which permits relative movement of the wheel with respect to the frame without impairing the efficiency thereof.

A further object of the invention is to provide an improved form of mounting for an individually mounted wheel.

A further object of the invention is to provide a mounting for an individually mounted wheel which permits relative movement of the wheel with respect to the frame, not only in a vertical plane which is parallel to the vehicle frame, but also in a plane perpendicular thereto.

Further objects, not specifically enumerated above, will be apparent as the invention is described in greater detail in connection with the accompanying drawings, wherein:

Figure 1 is a plan view, partly in section, showing an individually mounted wheel constructed in accordance with the present invention and provided with a drive which permits relative movement of the wheel with respect to the frame, both in longitudinal and transverse planes.

Figure 2 is a view in side elevation showing the wheel mounting in Figure 1.

Figure 3 is an end view of the frame and upper end of the driving mechanism.

Referring to the above drawings, $a$ designates a vehicle frame having an axle housing $b$ and a live axle $c$. The axle housing extends outwardly of the frame and carries a journal bracket $d$ formed with oppositely extending arms $d'$. A nut $e$ is secured to the end of the housing $b$ and prevents removal of the bracket $d$ axially thereof.

Wheels $f$ are mounted upon a stub axle $f'$ carried in a two part housing $g$. The housing is formed with a recess $g'$ within which a hinge pin $g^2$ is mounted. The hinge pin $g^2$ passes through the apertured end of one of the arms $d'$ on the bracket $d$ and thus permits movement of the housing $g$ transversely of the frame member $a$. Incidentally, the pin $g^2$ is radially disposed with respect to the axis of live axle $c$, thus permitting movement in such direction in addition to the provision afforded by bracket $d$ for rotatable movement of the housing $g$ with respect to the axle $c$.

The upper end of housing $g$ is formed with a head $g^3$ and an extension $g^4$. The extension $g^4$ is carried by the left hand apertured arm $d'$ and the axis thereof is coincident with that of the axis of hinge pin $g^2$. An elongated slot $g^5$ is formed on the inner face of the head $g^3$ to permit relative movement of the head with respect to the nut $e$ about the axis of the hinge pin $g^2$.

Within the extension $g^4$, a stub shaft $h$ is journaled, carrying a bevel pinion $h'$. Axle $c$ drives a bevel gear $c'$ which meshes with the bevel pinion $h'$. A shaft $i$ is journaled in the head $g^3$ and carries a bevel gear $i'$ which meshes with the bevel pinion $h'$, a sprocket wheel $i^2$ also being mounted on the stub shaft $i$. A driven sprocket wheel $f^2$ is mounted on the stub shaft $f'$ and is driven by sprocket wheel $i^2$ through a suitable chain indicated diagrammatically by the dot and dash lines at $j$.

In order to mount the frame upon the wheel housing and wheels, a bracket $k$ is secured to the frame and carries a cantilever spring $k'$. This spring projects outwardly into the path of a bearing surface $g^6$ and thus cushions relative movement of housing $g$ with respect to the frame $a$.

While the invention has been described with specific reference to the construction shown in the accompanying drawings, it is not to be limited, save as defined in the appended claims.

I claim as my invention:

1. A wheel mounting comprising a frame, a wheel, an axle housing, a housing mounting the wheel, means to journal the last named housing on the axle housing, means to permit movement of the housing and wheel angularly of the frame, a head in the housing, a driving bevel gear carried by the axle housing, a sprocket wheel mounted in the head and aligned with the driving gear, a bevel gear carried with the sprocket, and a bevel gear carried in the head and meshing with the last named bevel gear and the driving gear, the axis of the last named bevel gear passing through the axis of the driving gear and lying in the median plane of the sprocket.

2. A wheel mounting comprising a frame, a wheel, an axle housing, a housing mounting the wheel, means to journal the last named housing on the axle housing, means to permit movement of the housing and wheel angularly of the frame, a head in the housing, a driving bevel gear carried by the axle housing, a sprocket wheel mounted in the head and aligned with the driving gear, a bevel gear carried with the sprocket, and a bevel gear carried in the head and meshing with the last named bevel gear and the driving gear, the axis of the last named bevel gear passing through the axis of the driving gear.

3. A wheel mounting comprising a frame, a wheel, an axle housing, a housing mounting the wheel, means to journal the last named housing on the axle housing, means to permit movement of the housing and wheel angularly of the frame, a head in the housing, a driving bevel gear carried by the axle housing, a sprocket wheel mounted in the head and aligned with the driving gear, a bevel gear carried with the sprocket, and a bevel gear carried in the head and meshing with the last named bevel gear and the driving gear.

4. A wheel mounting comprising a frame, a wheel, an axle housing, a bracket journaled on the axle housing, a housing, a recess in the housing, an extension on the housing, the axes of the extension and recess lying in a straight line passing through the axis of the axle housing, means to journal the housing on the bracket at the recess and extension, driving means in the axle housing and housing, and means to mount the wheel on the housing.

5. A wheel mounting comprising a frame, a wheel, an axle housing, a bracket journaled on the axle housing, a housing, a recess in the housing, an extension on the housing, the recess and extension being axially aligned, means to journal the housing on the bracket at the recess and extension, and means to mount the wheel on the housing.

6. A wheel mounting comprising a frame, a wheel, an axle housing, a bracket journaled on the axle housing, a housing, a recess in the housing, an extension on the housing, means to journal the housing on the bracket at the recess and extension, and means to mount the wheel on the housing.

7. A wheel mounting comprising a frame, a wheel, an axle housing, a bracket journaled on the axle housing, a housing journaled on the bracket to permit movement of the housing angularly of the frame, and means to mount the wheel on the housing.

This specification signed this 8th day of June A. D. 1929.

ALFRED F. MASURY.